United States Patent
Li et al.

(10) Patent No.: US 10,421,686 B2
(45) Date of Patent: Sep. 24, 2019

(54) APPARATUS AND METHOD FOR STRENGTHENING GLASS COVER

(71) Applicants: BOE Technology Group Co., Ltd., Beijing (CN); Hefei BOE Optoelectronics Technology Co., Ltd., Anhui (CN)

(72) Inventors: Hu Li, Beijing (CN); Qing Zhang, Beijing (CN); Linfei Shao, Beijing (CN)

(73) Assignees: BOE TECHNOLOGY GROUP CO., LTD., Beijing (CN); HEFEI BOE OPTOELECTRONICS TECHNOLOGY CO., LTD., Anhui (CN)

( * ) Notice: Subject to any disclaimer, the term of this patent is extended or adjusted under 35 U.S.C. 154(b) by 178 days.

(21) Appl. No.: 15/656,122

(22) Filed: Jul. 21, 2017

(65) Prior Publication Data
US 2018/0057397 A1   Mar. 1, 2018

(30) Foreign Application Priority Data
Aug. 24, 2016 (CN) .......................... 2016 1 0715180

(51) Int. Cl.
*C03C 15/02* (2006.01)
*C03C 15/00* (2006.01)

(52) U.S. Cl.
CPC .............. *C03C 15/02* (2013.01); *C03C 15/00* (2013.01)

(58) Field of Classification Search
CPC ................................ C03C 15/00; C03C 15/02
See application file for complete search history.

(56) References Cited

U.S. PATENT DOCUMENTS 3,176,850 A * 4/1965 Rosner .................. C25D 17/08
204/297.09
2002/0084031 A1   7/2002 Doh

FOREIGN PATENT DOCUMENTS

| CN | 102898031 A | 1/2013 |
| CN | 104445977 A | 3/2015 |
| CN | 104628261 A | 5/2015 |
| CN | 205933620 U | 2/2017 |
| JP | 2008063166 A | 3/2008 |
| JP | 2008108413 A * | 5/2008 |

OTHER PUBLICATIONS

First Office Action from Chinese Patent Application No. 201610715180.0, dated Jan. 31, 2018, 10 pages.

* cited by examiner

*Primary Examiner* — Queenie S Dehghan
(74) *Attorney, Agent, or Firm* — Westman, Champlin & Koehler, P.A.

(57) ABSTRACT

This disclosure relates to an apparatus and a method for strengthening a glass cover, wherein the methods comprises the steps of providing baffles which are used to connect glass covers to be strengthened so as to constitute a annular structure; injecting a strengthening liquid into one side of the annular structure to form a strengthening liquid potential energy difference between two sides of the annular structure; and allowing the strengthening liquid to flow between two sides of the baffle so as to etch the glass covers.

12 Claims, 3 Drawing Sheets

APPARATUS AND METHOD FOR STRENGTHENING GLASS COVER

CROSS-REFERENCE TO RELATED APPLICATIONS

This application is a non-provisional application which claims priority to Chinese Patent Application No. 201610715180.0, filed on Aug. 24, 2016, with SIPO, the contents of which are hereby incorporated by reference.

FIELD OF THE INVENTION

This disclosure relates to the material processing field, and specifically, an apparatus for strengthening a glass cover, and accordingly a method for strengthening a glass cover.

BACKGROUND OF THE INVENTION

As the progress of science and technology, glass covers are increasingly used in normal display screens of electronic products, for example cell phones, etc. A glass cover is typically an optical glass, and has the functions of protecting display modules, carrying touch control sensor layers or decorative layers, mechanism assembly carriers, etc.

The types of glass covers may be generally divided into types according to functions thereof: the conventional glass covers purely used for protecting display modules and the sensor glass covers as the carriers of touch control elements. In comparison, the function of a conventional glass cover is to protect a display module from being damaged by an external force, water vapor, particles, etc., such as a non-touch module glass cover, an in-cell glass cover, an on-cell glass cover; while a sensor glass cover is required to carry a sensor structure, for example an OGS glass, a GF glass, in addition to the protection of a display module from being damaged by an external force, water vapor, particles, etc. However, with respect to any glass cover, the initial protective function of a glass cover is an extremely important function.

As the development of the function of human-computer interaction, there is a trend of increasing demand for creating holes (these holes are, for example, microphone holes, HOME button holes, etc., and the shape of the holes may be a annular shape, an elongated shape, and the like) on a glass cover. Creating a hole on the glass cover will certainly damage the structure of the glass surrounding the through hole and brings about defects such as collapses, cracks, etc. Therefore, after a hole is created on the glass cover, the glass structure surrounding the through hole is required to be strengthened. With respect to a glass cover, the change in the structure at the edge will be caused in the process of cutting the glass cover, and therefore the edge of the glass cover is further required to be strengthened at the same time.

By classification according to the principles strengthening, the methods for strengthening glass covers are divided into two types, physical strengthening and chemical strengthening, and these two types of strengthening methods have the characteristics as follows.

Physical strengthening: the edge of the glass cover is polished by using a brush with a certain rigidity to reduce or eliminate defects such as collapses, cracks, etc., caused by cutting or edge grinding. This strengthening method has the disadvantage that since the size of the through hole is relatively small (taking a annular microphone as an example, the diameter of the through hole is typically 0.8 mm-1.2 mm), this method cannot strengthen the position of the through hole and is prone to cause the glass cover to begin to break down with the through hole desired to be strengthened as the center.

Chemical strengthening: a glass cover is soaked in a strong acid solution and the glass is etched with the strong acid solution so as to achieve the object of reducing or eliminating defects such as collapses, crack, etc. An OGS structure allows a touch control element to be produced on a glass surface. When chemical strengthening is performed, in order to prevent the touch control element from being damaged in the process of etching, an acid-resistant film, which is acid resistant, is required to be attached on the surface of the glass before chemical strengthening is performed to expose the position such as the edge, the through hole, etc., which is required to be strengthened. Theoretically, the method of chemical strengthening may strengthen the position of the through hole. However, due to the presence of the liquid surface tension between the glass and the strong acid at the through hole, the flowability of the acid liquid at the through hole is very poor and the etching speed of the strengthening of the through hole is obviously slower than the etching speed at the position of the edge, resulting in insufficient strengthening of the through hole. If the etching time is simply elongated, it will result in excessive strengthening of the edge.

SUMMARY OF THE INVENTION

In order to overcome a part or all of the defects described above, this disclosure provides an apparatus for strengthening a glass cover, comprising: baffles which are used to connect glass covers to be strengthened so as to constitute a annular structure; a base which is bonded to the annular structure so as to form a containing chamber for containing a strengthening liquid, wherein the containing chamber is divided into two parts by the annular structure; and an injection pipeline for injecting a strengthening liquid to one side of the annular structure, wherein a strengthening liquid potential energy difference between two sides of each glass cover is formed by the strengthening liquid to enable the strengthening liquid to flow from one side of the annular structure to the other side of the annular structure through a through hole on each glass cover.

The apparatus preferably comprises the characteristics as follows.

The baffles are a plurality of baffles independent of each other, a gap for inserting one of the glass covers is formed between adjacent baffles, and a trough for receiving a glass cover is formed on a side surface of a baffle.

A member capable of adjusting the position of a baffle is provided between the baffle and the base.

The trough is a trough which is all through from top to bottom.

Each of the baffles comprises a first bending portion and a second bending portion which are connected, wherein an included angle is formed between the first bending portion and the second bending portion and the included angle formed between the first bending portion and the second bending portion of each of the baffles is $180°\times(n-2)/2$, and wherein n is the total number of the baffles.

One end of the injection pipeline is used to be connected to a strengthening liquid source and the other end of the injection pipeline extends into the containing chamber and is located on one side of the annular structure, and a first two-way pump is further provided in the injection pipeline.

The apparatus for strengthening a glass cover further comprises an outflow pipeline for withdrawing the strengthening liquid from the other side of the annular structure, and one end of the outflow pipeline extends into the containing chamber and is located on the other side of the annular structure and the other end of the outflow pipeline is connected to the strengthening liquid source.

A concave platform is formed at one side corresponding to the outflow pipeline in the containing chamber; and/or, a second two-way pump is provided in the outflow pipeline.

This disclosure also relates to method for strengthening a glass cover, comprising the steps of:

step 1: bonding glass covers and baffles to form a closed annular structure, and bonding the annular structure and a base to form a containing chamber for containing a strengthening liquid, wherein the containing chamber is divided into two parts by the annular structure;

step 2: injecting a strengthening liquid into the containing chamber on one side of the annular structure to form a strengthening liquid potential energy difference between two sides of the annular structure;

step 3: allowing the strengthening liquid to flow from one part of the containing chamber on one side of the annular structure to another part of the containing chamber on the other side through a through hole on each glass cover so as to strengthen the glass cover; and step 4: recovering the strengthening liquid from the annular structure after strengthening is completed.

When the glass covers and the baffles are bonded, the height of the through hole is preferably controlled to be as low as possible.

DETAILED DESCRIPTION OF THE INVENTION

The contents of this disclosure will be further elaborated in detail below in conjunction with accompanying drawings and specific embodiments.

Figure 1:
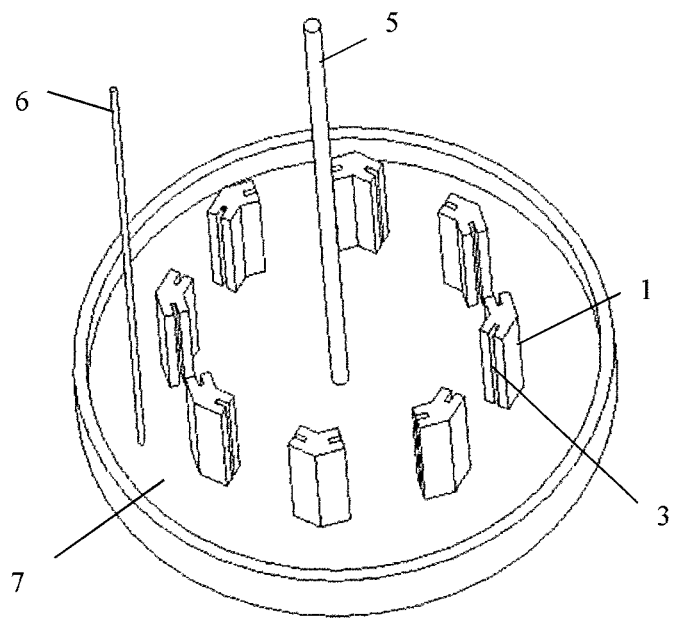
FIG. 1 is a schematic diagram of the apparatus according to this disclosure in which no glass cover to be strengthened is mounted.
Figure 2:
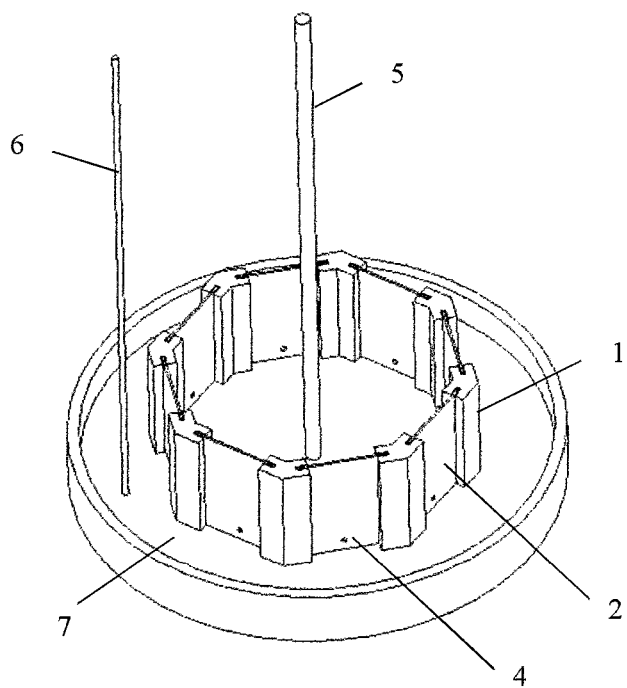
FIG. 2 is a schematic diagram of the apparatus according to this disclosure in which glass covers to be strengthened have been mounted.
Figure 3:
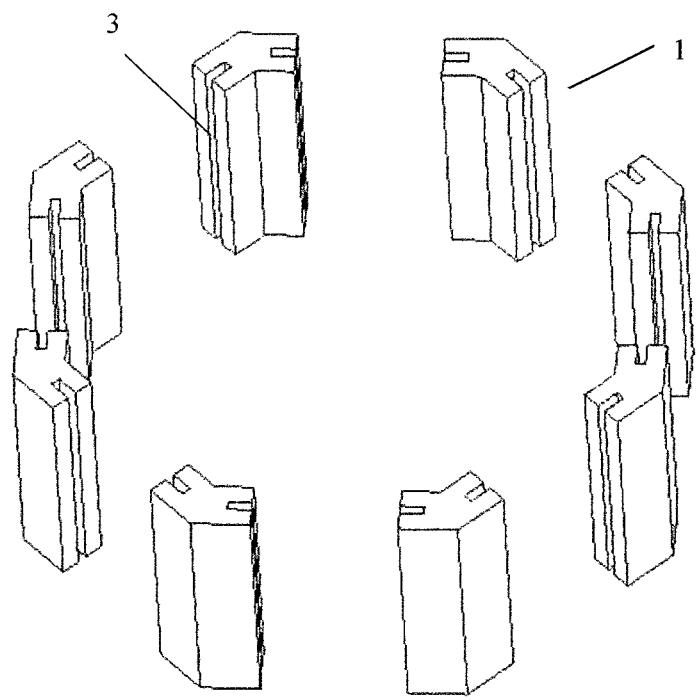
FIG. 3 is a structural schematic diagram of baffles which are not bonded to glass covers.
Figure 5:
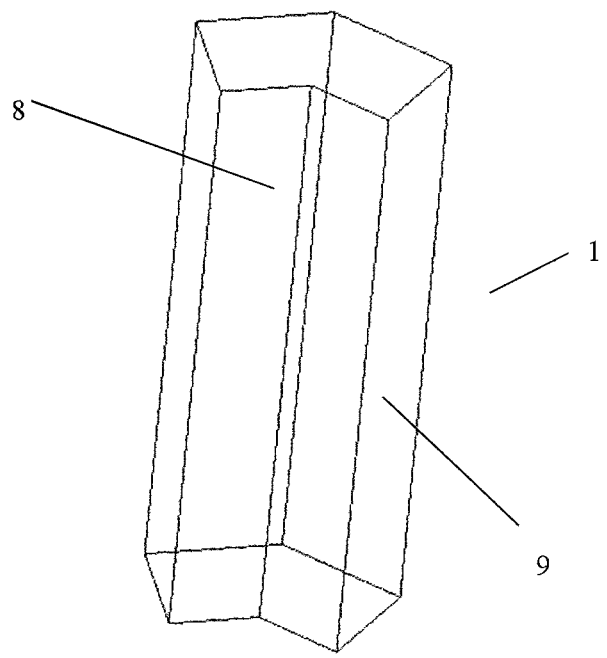
FIG. 5 is a schematic diagram of a first exemplary structure of a baffle.
Figure 6:
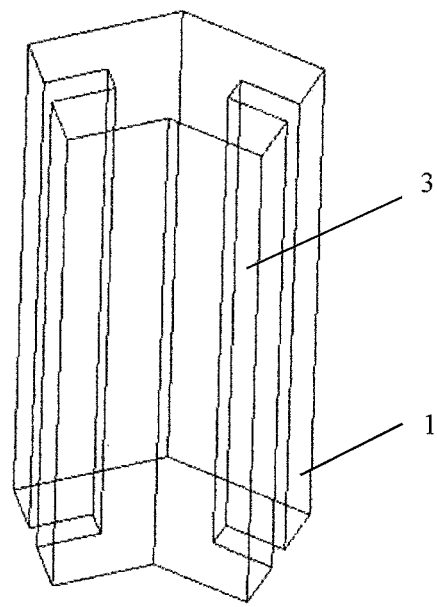
FIG. 6 is a schematic diagram of a second exemplary structure of a baffle.

As shown in FIGS. 1 and 2, an apparatus for strengthening a glass cover according to this disclosure is shown. The apparatus comprises a plurality of baffles 1, and when the apparatus is not in the working state, an incomplete annular structure is formed by the baffles 1. A magnified view of this annular structure is shown in FIG. 3. The side surfaces of two adjacent baffles 1 are opposite to receive a glass cover 2 to be strengthened. A containing chamber for a strengthening liquid/etching solution is formed by the baffles 1 and a base 7. In an embodiment illustrated, the containing chamber formed is separated into two portions by this annular structure. Preferably, a trough 3 is provided on a side surface of the baffle 1 in order to better receive the glass cover 2. FIG. 5 is a magnified view of the baffle 1 on which the trough 3 is not provided, and FIG. 6 is a magnified view of the baffle 1 on which the trough 3 is provided.

Figure 4:
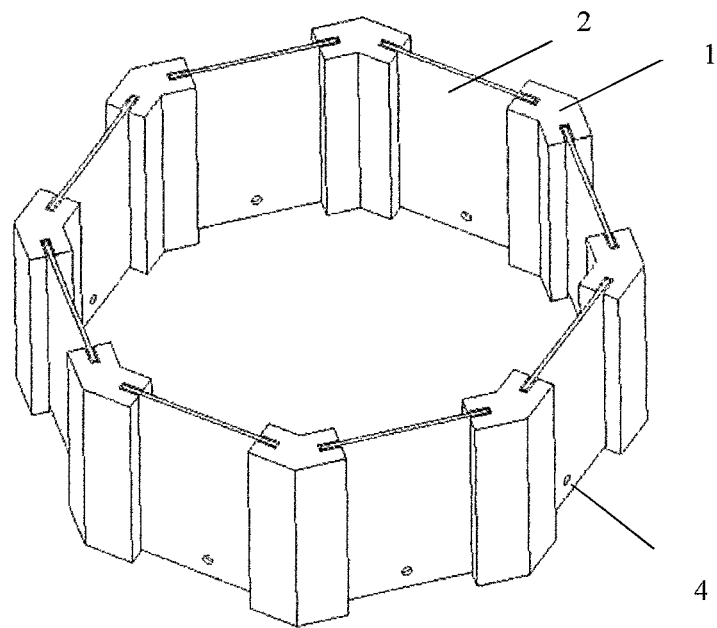
FIG. 4 is a structural schematic diagram of baffles which have been bonded to glass covers.

When the glass covers 2 are strengthened, the glass covers 2 are inserted between two baffles 1, and more preferably, are inserted in the troughs 3 of the baffles 1 to form a closed annular structure. A magnified view of this closed annular structure is shown in FIG. 4. A base 7 is provided below this annular structure to form a containing chamber for containing a strengthening liquid/etching liquid. In the process of strengthening the glass covers 2, there is a liquid level difference of the liquid in the containing chamber on two sides of the closed annular structure, and therefore there is a potential energy difference between two sides of the annular structure. This potential energy difference forces the liquid to flow from one side of the annular structure to the other side through a through hole 4 in each glass cover 2 so as to strengthen the structure surrounding the through hole 4 in the glass cover 2. The manner of bonding between the glass covers 2 and the trough 3 may not use a trough, and any possible manner of bonding known in the prior art may be used.

Preferably, each of the baffles 1 is independently produced, and they are integrally assembled in a particular application of strengthening. In order to fit for different sizes of the glass covers 2, a member for adjusting the position of the baffle is (for example, reducing or increasing the distance between baffles) is provided between the base 7 and the baffle 1 to adapt to larger or smaller sizes of the glass covers 2. As shown in FIGS. 5 and 6, the baffle 1 has a first bending portion 8 and a second bending portion 9 which are connected to each other, and the angle between the first bending portion 8 and the second bending portion 9 is adjusted according to the number of the glass covers which are etched by performing etching once (this number is equal to the number of the baffles 1). In preferable embodiments shown in FIGS. 1 and 2, the baffles 1 are eight baffles having the same size, and an angel of 135° is formed between the first bending portion 8 and the second bending portion 9. It can be contemplated that different numbers of the baffles 1 may be used, for example, four baffles wherein an angel of 90° is formed between the first bending portion 8 and the second bending portion 9, five baffles wherein an angel of 108° is formed between the first bending portion 8 and the second bending portion 9, and six baffles wherein an angel of 120° is formed between the first bending portion 8 and the second bending portion 9. The angle formed between the first bending portion 8 and the second bending portion 9 of the baffle is 180°×(n−2)/n, and wherein n is the number of the baffles. The number of the baffles 1 and the angle formed between the first bending portion 8 and the second bending portion 9 are adjusted according to the number of the glass covers 2 which are desired to be etched every time.

In a preferable embodiment, the trough 3 is a trough which is all through from top to bottom. The trough 3 is at least through on the upper part, i.e., through in the direction where the glass cover 2 is inserted. It can be contemplated that in the bonding of the glass cover 2 and the baffle 1, the strengthening liquid is permeable at the bonding edge, so that the small hole in the glass cover 2 is strengthened while the edge of the glass cover 2 is also strengthened. The trough 3 on the lower part of the baffle 1 may have a relatively short non-through portion, which means that the strengthening liquid may slowly flow out of the lower edge portion of the glass cover 2 to strengthen the lower edge portion of the glass cover. That is, the through hole 4 in the glass cover 2 is strengthened while the lower edge portion of the glass cover 2 may also be strengthened.

When the glass covers 2 and the baffles 1 are bonded, the through hole 4 in the glass cover 2 is preferably allowed to be at a position as low as possible. In this way, the potential energy difference formed by the liquid between two sides of the annular structure may be maximally used to break through the liquid tension at the through hole 4, so that the liquid flows from one side of the through hole 4 to the other side to strengthen the glass structure at the through hole 4 in the glass cover 2.

As shown in FIGS. 1 and 2, An injection pipeline 5 is provided on one side of the annular structure formed, while an outflow pipeline 6 is provided on the other side. Preferably, the injection pipeline 5 is provided on the inner side of the annular structure, while the outflow pipeline 6 is provided on the outer side of the annular structure. In this arrangement, a concave platform of the containing chamber formed by the base 7 and the annular structure is formed on the outer side of the annular structure to receive the strengthening liquid injected from the inner side of the annular structure. It can be contemplated that a converse arrangement may be used. That is, the injection pipeline 5 is provided on the outer side of the annular structure, while the outflow pipeline 6 is provided on the inner side of the annular structure. At this point, a relatively high cylinder structure is required to be provided on the outer side of the annular structure to contain a sufficient strengthening liquid. Although each of the numbers of the injection pipeline 5 and the outflow pipeline 6 is 1 in embodiments shown in FIGS. 1 and 2, it can be contemplated that a plurality of injection pipelines 5 and outflow pipelines 6 may be provided. In a preferable embodiment illustrated, both the injection pipeline 5 and the outflow pipeline 6 extend above, and it can be contemplated that both the injection pipeline 5 and the outflow pipeline 6 are in fluid communication with a strengthening liquid source. In this way, the strengthening liquid may be used repeatedly to improve the utilization of the strengthening liquid. A pump may be provided in each of the injection pipeline 5 and the outflow pipeline 6 to direct the flow of the strengthening liquid. That is, the pump in the injection pipeline 5 forces the strengthening liquid to enter the annular structure, while the pump in the outflow pipeline 6 forces the strengthening liquid to leave the annular structure. Preferably, the pump provided in the injection pipeline 5 is a two-way pump. Thus, the strengthening liquid may be injected along the injection pipeline 5 and may also be recovered along the injection pipeline 5, so that the recovery speed is increased. It can be assumed that the outflow pipeline 6 extends downward and direct the strengthening liquid, and at this point, the liquid may flow merely by virtue of the gravity of its own and the pump is not additionally provided any more.

In view of the thickness of a common glass cover 2 being 0.55 mm, 0.7 mm, 1.1 mm, the thickness of the trough 3 is preferably set to be 1.2 mm to contain glass covers 2 having different thicknesses.

The process of strengthening a glass cover 2 by using an apparatus according to that illustrated is as follows.

Firstly, glass covers 2 and baffles 1 are bonded to form a closed annular structure as shown in FIG. 2, and the annular structure and a base 7 are bonded to form a containing chamber for containing a strengthening liquid.

Then, a strengthening liquid is injected to the containing chamber on one side of the annular structure to form a strengthening liquid potential energy difference between two portions of the containing chamber on two sides of the annular structure. In embodiments shown in FIGS. 1 and 2, the strengthening liquid is injected to the inner side of the annular structure using an injection pipeline 5, the liquid level in the inner side of the annular structure is higher than the liquid surface in the outer side, and the liquid level difference between the inner side and the outer side of the annular structure constitutes the potential energy difference between two sides of the through hole 4 of each glass cover 2.

The potential energy difference formed in the step described above allows the strengthening liquid to flow from one side of the annular structure to the other side through the through hole 4 on the annular glass covers 2. In an embodiment illustrated, the strengthening liquid flows from the inner side to the outer side of the glass cover 2, while the position of the glass cover 2, particularly the through hole 4 of the glass cover 2, are strengthened. It can be contemplated that the strengthening liquid may flow in an opposite direction.

Finally, the strengthening liquid is recovered from the annular structure after strengthening is completed. In an embodiment illustrated, the strengthening liquid may be recovered from the injection pipeline 5 and the outflow pipeline 6 at the same time. However, the strengthening liquid may be merely recovered through the outflow pipeline 6.

The strengthening liquid is preferably an etching liquid, and further preferably a HF-HCL etching liquid. Accordingly, the apparatus is produced from a corrosion-resistant material, for example produced from a PVC material.

The disclosure provides an apparatus and a method for strengthening a glass cover. By the potential energy difference of the etching liquid formed between two sides of each glass covers, the apparatus for strengthening a glass cover and the corresponding method for strengthening proposed in this disclosure break through the surface tension at the through hole of the glass cover, and enables the strengthening liquid at the through hole to favorably flow so as to strengthen the glass cover.

Obviously, with respect to the person skilled in the art, various modifications and variations may be made to the embodiments disclosed hereinbefore without departing from the scope or spirit of this invention. According to the practice of this invention disclosed in this specification, other embodiments of this invention are apparent to the person skilled in the art. This specification and examples disclosed thereby should be considered to be exemplary, and the actual scope of this invention is specified by appended claims and equivalents thereof.

What is claimed is:

1. An apparatus for strengthening a glass cover, comprising: baffles which are used to connect glass covers to be strengthened so as to constitute an annular structure; a base which is bonded to the annular structure so as to form a containing chamber for containing a strengthening liquid, wherein the containing chamber is divided into two parts by the annular structure; and an injection pipeline for injecting a strengthening liquid to one side of the annular structure, wherein a strengthening liquid potential energy difference between two sides of each glass cover is formed by the strengthening liquid to enable the strengthening liquid to flow from one side of the annular structure to the other side of the annular structure through a through hole on each glass cover.

2. The apparatus for strengthening a glass cover according to claim 1, wherein the baffles are a plurality of baffles independent of each other, a gap for inserting one of the glass covers is formed between adjacent baffles, and a trough for receiving a glass cover is formed on a side surface of a baffle.

3. The apparatus for strengthening a glass cover according to claim 2, wherein a member capable of adjusting the position of a baffle is provided between the baffle and the base.

4. The apparatus for strengthening a glass cover according to claim 3, wherein one end of the injection pipeline is connected to a strengthening liquid source and the other end of the injection pipeline extends into the containing chamber and is located on one side of the annular structure, and a first two-way pump is further provided on the injection pipeline.

5. The apparatus for strengthening a glass cover according to claim 2, wherein the trough is a trough which is all through from top to bottom.

6. The apparatus for strengthening a glass cover according to claim 5, wherein one end of the injection pipeline is connected to a strengthening liquid source and the other end of the injection pipeline extends into the containing chamber and is located on one side of the annular structure, and a first two-way pump is further provided on the injection pipeline.

7. The apparatus for strengthening a glass cover according to claim 2, wherein each of the baffles comprises a first bending portion and a second bending portion which are connected, wherein an included angle is formed between the first bending portion and the second bending portion, and the included angle formed between the first bending portion and the second bending portion of each of the baffles is $180° \times (n-2)/2$, wherein n is the total number of the baffles.

8. The apparatus for strengthening a glass cover according to claim 7, wherein one end of the injection pipeline is connected to a strengthening liquid source and the other end of the injection pipeline extends into the containing chamber and is located on one side of the annular structure, and a first two-way pump is further provided on the injection pipeline.

9. The apparatus for strengthening a glass cover according to claim 2, wherein one end of the injection pipeline is connected to a strengthening liquid source and the other end of the injection pipeline extends into the containing chamber and is located on one side of the annular structure, and a first two-way pump is further provided on the injection pipeline.

10. The apparatus for strengthening a glass cover according to claim 1, wherein one end of the injection pipeline is used to be connected to a strengthening liquid source and the other end of the injection pipeline extends into the containing chamber and is located on one side of the annular structure, and a first two-way pump is further provided in the injection pipeline.

11. The apparatus for strengthening a glass cover according to claim 1, further comprising an outflow pipeline for withdrawing the strengthening liquid from the other side of the annular structure, and one end of the outflow pipeline extends into the containing chamber and is located on the other side of the annular structure, and the other end of the outflow pipeline is connected to the strengthening liquid source.

12. The apparatus for strengthening a glass cover according to claim 11, wherein a concave platform is formed at one side corresponding to the outflow pipeline in the containing chamber; and/or, a second two-way pump is provided in the outflow pipeline.

* * * * *